United States Patent Office.

AMBROSE G. FELL, OF BROOKLYN, NEW YORK.

Letters Patent No. 72,830, dated December 31, 1867.

---

IMPROVEMENT IN RENDERING ARTICLES INCOMBUSTIBLE.

---

The Schedule referred to in these Letters Patent and making part of the same.

---

TO ALL WHOM IT MAY CONCERN:

Be it known that I, AMBROSE G. FELL, of the city of Brooklyn, in the State of New York, have discovered a new Mode of Treating Substances, such a Wood, Textile Fabrics, Paper, &c., in order to Render them Non-Inflammable; also to preserve the wood or other analogous substance from decay; and do hereby declare the following to be a full, clear, and exact description thereof.

My mode of treating for such purposes all kinds of fabrics in the nature of textile or paper, &c., consists in saturating them with a compound solution, consisting of phosphate of ammonia and sulphate of ammonia. I prefer, in making this solution, however, to use the following proportions, namely: To every one and one-fourth ounce of the former, six and three-fourths ounces of the latter salts for every gallon of water used. Either salt may be used separately, to prevent flames, but the substances so saturated will retain heat, and in the case of the sulphate being used alone, sparks, which, under some circumstances, in some materials, would finally consume them; but this is not so with the combination of the two. Also, phosphate of ammonia, when used alone, is expensive, but when used in combination with a sulphate of ammonia, the phosphate being derived, as now about to be described, is both effective and economical; that is to say, common bones, in a reduced condition, are treated with sulphuric acid, as in the ordinary preparation of superphosphate of lime for manure. This compound, while yet in a wet condition, is treated with a solution of sulphate of ammonia, which imparts a portion of its sulphuric acid to the lime of the superphosphate formed, and absorbs in its stead phosphoric acid, forming phosphate of ammonia, which dissolves in the sulphate of ammonia solution, forming the required compound. When all the soluble superphosphate of lime has thus been decomposed, the bones may be again treated with a fresh quantity of sulphuric acid, and again used, and so on until all the phosphoric acid has been combined with its required equivalent of sulphate of ammonia. The amount of sulphuric acid used is in proportion to the amount of superphosphate of lime I wish to obtain to form the after-combination in its required proportions. These light substances, such as textile fabrics, paper, and analogous substances, need only to be dipped in the solution; but in treating substances as solid as timber or other pieces of wood, the solution requires to be driven into the pores by hydraulic pressure, which I prefer to do by means of an arrangement similar, or nearly so, to that employed by Sir William Burnett, in England, when forcing chloride of zinc into timber for the purpose of preventing it from rotting, as found described in Parnell's "Applied Chemistry." Thus, with my invention, valuable books, papers, also bonds, bank-notes, coupons, &c., may be rendered perfectly non-inflammable at a low cost. Wood used in dwellings and vessels becomes perfectly fire-proof, as well as preserved from the effects of decay and ravages of insects and worms. Wearing-apparel and coverings for merchandise can have the same properties imparted to them.

What I claim as new, and desire to secure by Letters Patent, is—

The application of the compound herein described to wood, textile fabrics, paper, and all analogous substances, substantially as described for the purposes specified.

AMBROSE G. FELL.

Witnesses:
WM. H. BISHOP,
A. DE LACY.